Aug. 27, 1935.                L. J. MINBIOLE                2,012,725
                                 BUMPER
                           Filed Dec. 10, 1931
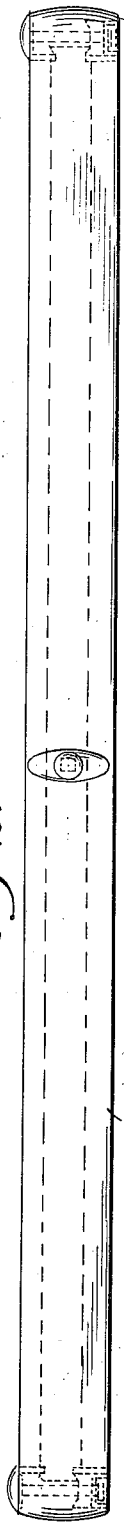
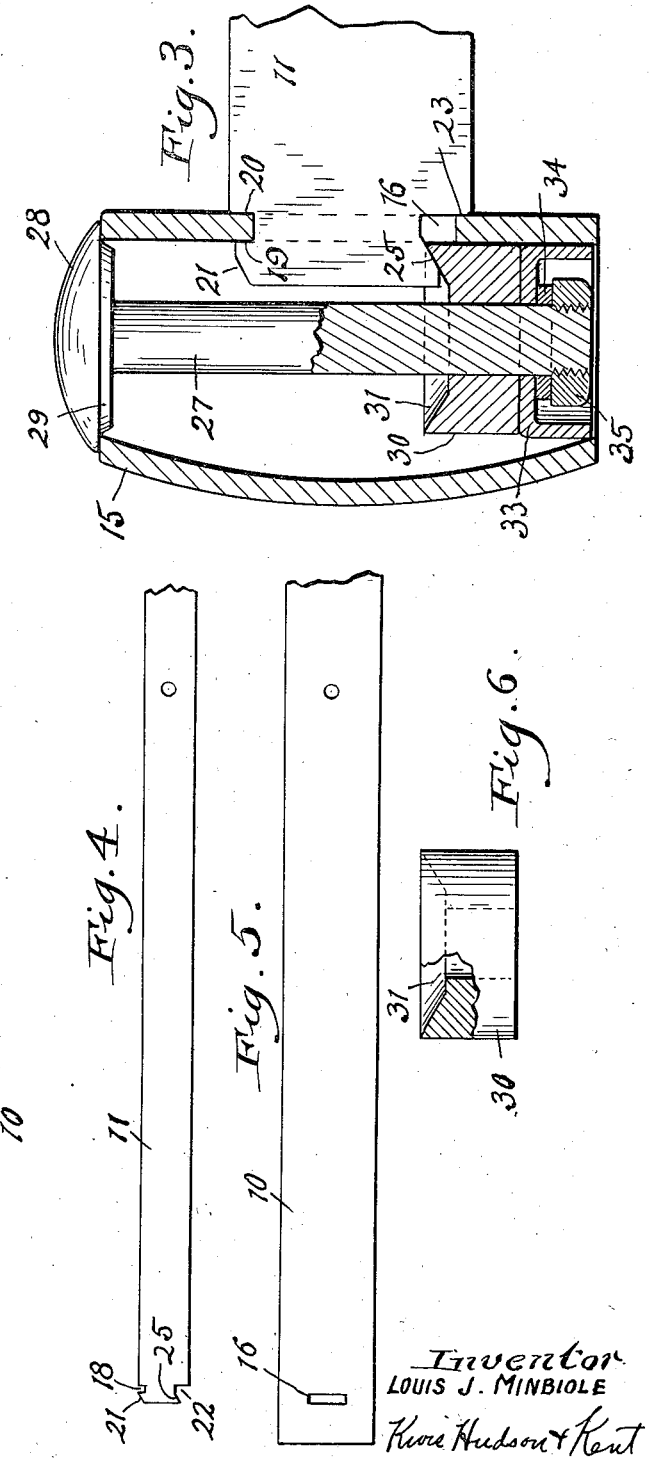
Inventor
LOUIS J. MINBIOLE
Knore Hudson & Kent
attys.

Patented Aug. 27, 1935

2,012,725

UNITED STATES PATENT OFFICE 2,012,725

BUMPER

Louis J. Minhiole, Cleveland, Ohio, assignor to Eaton Manufacturing Company, Cleveland, Ohio, a corporation of Ohio Application December 10, 1931, Serial No. 580,139

12 Claims. (Cl. 293—55)

This invention relates to a bumper for motor vehicles and more particularly to an end construction especially adapted for bumpers of the single impact bar type.

It is one of the objects of the present invention to provide a bumper end construction which will be capable of withstanding great shock.

A further object of the present invention is to provide an end construction for a bumper of the type referred to which will be economical to manufacture and easy to assemble.

Other objects of the invention and features of novelty will be apparent from the following description taken in connection with the accompanying drawing, of which Figure 1 is a top plan view of a bumper employing the end construction provided by my invention, certain parts being broken away to more clearly reveal other parts;

Fig. 2 is a front elevational view of the bumper shown in Fig. 1;

Fig. 3 is an enlarged sectional view taken along the line 3—3 of Fig. 1;

Fig. 4 is a plan view of one end of the rear bar;

Fig. 5 is a plan view of one end of the impact bar at one stage in its manufacture; and Fig. 6 is a view of the locking collar placed within the eye on the impact bar, with a part broken away.

Referring to the drawing, Figs. 1 and 2 illustrate a front bumper comprising a relatively wide impact or front bar 10, and a narrower rear bar 11. The rear bar is adapted to be secured to the side members of an automobile, and is curved to meet the front bar as at 12, according to the common practice. The front and rear bars are also secured together at their ends and this invention is directed to novel means for securing these ends together. It should be understood, however, that this invention is not limited to front bumpers, but is equally applicable to rear bumpers, nor is it limited to any particular widths or thicknesses of bars, it being possible to vary the proportions of these members, if desired.

It will be seen from the drawing that the impact bar 10 is constructed from a relatively wide bar. This bar is made of spring steel, and is preferably concavo-convex in cross-section, the convex face constituting the impact surface of the bar. It should be understood, however, that this invention is not limited to a concavo-convex front bar, but that it is equally applicable to a flat bar or a bar of any other cross-section.

The end of the front bar is bent around so as to form an eye or cylinder 15. When the eye is formed, the curvature may be removed from a part of the bar stock so that the inner portion of the eye is substantially a portion of a cylinder, while the outer portion of the eye is substantially barrel-shaped. A narrow, vertically extending slot 16 is cut in the inner side of the eye. This slot may be punched in the impact bar before the eye is formed on the bar. The impact bar, after the slot has been punched in the bar, but before the eye has been formed, is shown in Fig. 5. The slots 16 are preferably just large enough to permit the ends of the rear bar to be entered into the eyes 15 as hereinafter described.

The rear bar 11 is preferably constructed of spring steel, and, as illustrated, is a flat bar which is somewhat narrower but thicker than the stock from which the front bar is constructed. The end of the rear bar is notched or recessed as may best be seen in Figs. 3 and 4. As viewed in Figs. 3 and 4, there is a notch 18 cut in the upper edge of the rear bar. This notch is of substantially the same width as the thickness of the impact bar. The sides of the notch are parallel, forming shoulders 19 and 20 which engage the wall of the eye on the impact bar in the manner shown in Fig. 3. The upper corner of the end of the rear bar may be bevelled off as at 21.

The lower edge of the rear bar has a recess 22 adjacent the end of the bar. One face of this recess is substantially perpendicular, forming a shoulder 23, which is in the same plane as the shoulder 20. The other face 25 of the recess is cut on an angle and is substantially parallel to the surface 21 at the top edge of the bar.

A bolt 27 having a relatively large head 28 is placed within the eye. The outer face of the head may be round, as shown, while a conical shoulder 29 is formed on the inner face of the head in order to center the head of the bolt with respect to the eye. The shank of the bolt extends through the eye and is preferably of such length that it will not project below the bottom of the eye. A collar 30 having a conical upper face 31 is placed on the bolt 27. The conical face of the collar engages the face 25 of the recess in the lower edge of the rear bar. The collar 30 is preferably of such a diameter that it will engage the interior of the eye 15 for a part of its circumference, while at the same time it should be small enough to pass through the opening at the end of the eye. A cup-shaped member 33, together with a lock washer 34 and a nut 35, are placed on the bolt below the collar 30. The member 33 engages the interior of the eye 15 and centers the bottom of the bolt in the eye. In the preferred construction the member 33 engages the interior of the eye 15 throughout its entire circumference.

When the nut 35 is tightened, the collar 30 is forced against the rear bar, moving the rear bar up so that the wall of the eye 15 fits into the notch in the upper edge of the rear bar. The shoulder 19 which engages the interior of the eye, and the face 25 of the recess in the lower edge of the bar which engages the conical surface on the collar 30 then prevent the rear bar pulling out of the eye. The shoulders 20 and 23 which engage the outer wall of the eye, keep the rear bar from projecting further into the eye.

From the foregoing it will be seen that the bumper provided by my invention is economical to manufacture and assemble. The bars are of very simple design and can be easily cut to shape, while the other parts required are few in number and easily made. The bumper is readily assembled as it is only necessary to spring the rear bar sufficiently to insert the ends thereof in the slots in the eyes in the front bar, place the collars and the centering members on the bolts and then tighten the nuts. This secures the bars rigidly together so that there is no danger that the bumper will rattle.

The bumper provided by my invention is capable of withstanding great shock as the bars are held together by means of shoulders on the rear bar. In case of an impact, the rear bar cannot project further into the eye because of the two shoulders which engage the outside of the eye. The rear bar cannot pull out of the eye as there is a shoulder which engages the inside of the eye. In addition, the rear bar is held by the collar, which in turn is held by the bolt, as well as bearing against the interior of the eye for a part of its circumference.

While I have illustrated and described in detail one form of bumper embodying my invention, it should be understood, however, that I do not intend to limit myself to these precise details and arrangements of structure, but regard my invention as including such changes and modifications as do not involve a departure from the spirit of the invention and the scope of the appended claims.

Having thus described my invention, I claim:

1. In a bumper, an impact bar having an integral eye at the end thereof, a slot in the inner side of said eye, a rear bar projecting through said slot, said rear bar having a pair of shoulders thereon, one of said shoulders engaging the interior of said eye, the other of said shoulders engaging the exterior of said eye, and means for maintaining the bars in operative relation.

2. In a bumper, an impact bar having an integral eye at the end thereof, a slot in the inner side of said eye, a rear bar projecting through said slot, said rear bar having a notch in one edge thereof, one wall of said eye extending into said notch, and means for maintaining the bars in operative relation.

3. In a bumper, an impact bar, an eye at the end of said impact bar, a slot in the inner side of said eye, a rear bar projecting through said slot, the rear bar having a recess in one edge adjacent its end, and a member within said eye engaging a face of said recess to maintain the bars in operative relation.

4. In a bumper, an impact bar, an eye at the end of said impact bar, a slot in the inner side of said eye, a rear bar projecting through said slot, the rear bar having a recess in one edge adjacent its end, a bolt having a head engaging and closing the upper end of said eye, and a member carried by said bolt and engaging a face of said recess to maintain the bars in operative assembly.

5. In a bumper, an impact bar, an eye at the end of said impact bar, a slot in the inner side of said eye, a rear bar projecting through said slot, said rear bar having a notch in one edge and a recess in the opposite edge, one wall of said eye extending into said notch, and a member within said eye engaging a face of said recess to maintain the bars in operative relation.

6. In a bumper, an impact bar, an eye at the end of said impact bar, a slot in the inner side of said eye, a rear bar projecting through said slot, the rear bar having a recess in one edge adjacent its end, a bolt having a head engaging and closing the upper end of said eye, means to maintain the bolt substantially centrally of said eye, and means carried by said bolt engaging a face of said recess to maintain the bars in operative relation.

7. In a bumper, an impact bar, an eye at the end of said bar, a slot in the inner side of said eye, a rear bar projecting through said slot, said rear bar having a shoulder thereon, said shoulder engaging the exterior of said eye, an edge of the rear bar within said eye having an inclined face, a member within said eye having an inclined surface and engaging said inclined face to secure said shoulder against the exterior of said eye.

8. In a bumper, an impact bar, an eye at the end of said bar, a slot in the inner side of said eye, a rear bar projecting through said slot, each edge of said rear bar having a shoulder thereon, said shoulders engaging the exterior of said eye on opposite sides of said slot, and clamping means within said eye including cooperating wedging surfaces for maintaining the bars in the arrangement specified.

9. In a bumper, an impact bar, an eye at the end of said bar, a slot in the inner side of said eye, a rear bar projecting through said slot, each edge of said rear bar having a shoulder thereon, said shoulders engaging the exterior of said eye, an edge of the end of the rear bar within said eye having an inclined face, a member within said eye having an angular face thereon, said member engaging the inclined face on the edge of said rear bar to secure the shoulders on the rear bar against said eye.

10. In a bumper, an impact bar having an eye at its end provided with a slot, a supporting bar having an end projected through said slot and provided with a notch in one edge forming shoulders adapted to engage the interior and exterior of said eye, said end also having a recess in its other edge forming a shoulder adapted to engage the exterior of said eye, and an inclined surface within the eye, a bolt arranged in said eye, a member on said bolt having an inclined surface cooperating with the first mentioned inclined surface, and a nut on said bolt for securing the parts in the arrangement specified.

11. In a bumper, an impact bar having an eye at its end provided with a slot, a supporting bar having an end projected through said slot and provided with a notch in one edge forming shoulders adapted to engage the interior and exterior of said eye, said end also having a recess in its other edge forming a shoulder adapted to engage the exterior of said eye, and an inclined surface within the eye, a bolt arranged in said eye, a member on said bolt having an inclined surface cooperating with the first mentioned inclined surface, a washer on said bolt for holding the latter against lateral movement, and a nut on said bolt for securing the parts in the arrangement specified.

12. In a bumper, an impact bar having an integral eye at its end provided with a slot, a supporting bar having an end projected through said slot and provided with a notch in one edge forming shoulders adapted to engage the interior and exterior of said eye, and a bolt in said eye for securing the parts in the arrangement specified.

LOUIS J. MINBIOLE.